United States Patent
Purkey

(10) Patent No.: US 6,717,291 B2
(45) Date of Patent: Apr. 6, 2004

(54) CAPACITOR-BASED POWERING SYSTEM AND ASSOCIATED METHODS

(75) Inventor: Bruce Purkey, Rogers, AR (US)

(73) Assignee: Purkey's Electrical Consulting, Rogers, AR (US)

( * ) Notice: Subject to any disclaimer, the term of this patent is extended or adjusted under 35 U.S.C. 154(b) by 159 days.

(21) Appl. No.: 09/938,796

(22) Filed: Aug. 24, 2001

(65) Prior Publication Data

US 2003/0034692 A1 Feb. 20, 2003

Related U.S. Application Data

(63) Continuation-in-part of application No. 09/802,112, filed on Mar. 8, 2001, now Pat. No. 6,426,606.
(60) Provisional application No. 60/286,772, filed on Apr. 26, 2001, and provisional application No. 60/238,903, filed on Oct. 10, 2000.

(51) Int. Cl.[7] ............................................. H01M 10/46
(52) U.S. Cl. ................. 307/10.6; 123/179.3; 290/38 R; 320/103; 320/127
(58) Field of Search ............................. 307/10.6, 10.1; 123/179.3; 290/38 R; 320/21, 145, 103, 127

(56) References Cited

U.S. PATENT DOCUMENTS

| | | | | |
|---|---|---|---|---|
| 4,004,208 A | * | 1/1977 | Tamminen | 320/134 |
| 4,412,137 A | * | 10/1983 | Hansen et al. | 307/10.6 |
| 4,492,912 A | | 1/1985 | Nowakowski | 320/6 |
| 4,494,162 A | | 1/1985 | Eyler | 361/29 |
| 4,549,089 A | * | 10/1985 | Buetemeister et al. | 290/38 R |
| 4,723,079 A | * | 2/1988 | Norton | 307/10.1 |
| 4,985,671 A | * | 1/1991 | Sauer | 307/10.6 |
| 5,002,840 A | * | 3/1991 | Klebenow et al. | 429/9 |
| 5,093,583 A | * | 3/1992 | Mashino et al. | 307/10.1 |
| 5,146,095 A | | 9/1992 | Tsuchiya | 290/38 R |

(List continued on next page.)

OTHER PUBLICATIONS

Goodall Mfg. LLC, "Charge–All Wheel Type Battery Chargers" Brochure, p. 19 Circa Dec. 2000; Eden Prairie Minn.

IntraUSA, "The Intra Switch" Brochure; Aug. 2000.

IntraUSA, "Intra Switch: Superior Cost Performance" Brochure; Aug. 2000.

Kbi/Koldban Int'l. Ltd., "KAPower Super Capacitors" Brochure, pp. 1–4; Circa Dec. 2000; Lake In The Hills, Ill.

Kbi/Loldban Int'l., "KAPower Installation–Operation Manual," pp. 1–12; Circa Jun., 2000; Lake In The Hills, Ill.

Purkey Fleet Electric, Inc., "Battery Optimizer" Brochure, pp. 1–2; 1998; Rogers Ark.

Sure Power Industries, Inc., "Low–Voltage Disconnects" Brochure, pp. 1–2; Circa Aug. 1998; Tualatin, Oregon.

*Primary Examiner*—Gregory J. Toatley, Jr.
*Assistant Examiner*—Roberto J. Rios
(74) *Attorney, Agent, or Firm*—Bracewell & Patterson, LLP

(57) ABSTRACT

A system, capacitor having auxiliary cells, and associated methods for starting an engine is provided. The capacitor is an enhanced-power capacitor that provides enhanced cranking power. The capacitor is isolated from the battery and the rest of the engine's electrical system at preselected times. The capacitor is electrically connected to the alternator when the engine is running and is charged by the alternator. When the engine is not running, the capacitor is electrically isolated to prevent the capacitor discharging by powering accessory devices; the battery can power devices while the capacitor remains electrically isolated. During starting, the capacitor provides all the power supplied to the starter solenoid. If the battery is too weak to energize the electrical system during starting, an override allows the capacitor to provide power for all starting functions.

36 Claims, 6 Drawing Sheets

U.S. PATENT DOCUMENTS

| | | | | |
|---|---|---|---|---|
| 5,155,373 A | * | 10/1992 | Tsuchiya et al. | 290/38 R |
| 5,155,374 A | * | 10/1992 | Shirata et al. | 290/38 R |
| 5,157,267 A | * | 10/1992 | Shirata et al. | 290/38 R |
| 5,166,538 A | * | 11/1992 | Norton | 307/10.1 |
| H1172 H | * | 4/1993 | Gorniak | 307/48 |
| 5,207,194 A | | 5/1993 | Clerici | 123/179.1 |
| 5,252,861 A | * | 10/1993 | Steeby et al. | 307/10.6 |
| 5,321,389 A | | 6/1994 | Meister | 340/455 |
| 5,402,758 A | * | 4/1995 | Land et al. | 123/179.3 |
| 5,475,270 A | * | 12/1995 | McRoy | 307/10.6 |
| 5,488,283 A | * | 1/1996 | Dougherty et al. | 307/10.1 |
| 5,563,454 A | * | 10/1996 | Araki et al. | 307/10.6 |
| 5,642,696 A | * | 7/1997 | Matsui | 123/179.3 |
| 5,818,115 A | * | 10/1998 | Nagao | 290/38 R |
| 5,925,938 A | | 7/1999 | Tamor | 290/31 |
| 5,970,937 A | * | 10/1999 | Casellato et al. | 123/179.3 |
| 5,977,744 A | * | 11/1999 | Williams et al. | 320/104 |
| 6,050,233 A | * | 4/2000 | Vilou | 123/179.3 |
| 6,075,331 A | * | 6/2000 | Ando et al. | 320/138 |
| 6,202,615 B1 | * | 3/2001 | Pels et al. | 123/179.3 |
| 6,242,887 B1 | | 6/2001 | Burke | 320/104 |
| 6,325,035 B1 | * | 12/2001 | Codina et al. | 290/38 R |
| 6,362,595 B1 | * | 3/2002 | Burke | 320/104 |
| 6,371,067 B1 | * | 4/2002 | Schmitz et al. | 123/179.3 |
| 6,426,606 B1 | * | 7/2002 | Purkey | 320/103 |
| 6,481,406 B2 | * | 11/2002 | Pels | 123/179.3 |
| 6,497,209 B1 | * | 12/2002 | Karuppana et al. | 123/179.3 |

* cited by examiner

CAPACITOR POWER FORMULA: $P = 1/2\, C^2 V$

NORMAL CAPACITOR-

| | | | |
|---|---|---|---|
| | 11.80 | 30X139 = | 4170 |
| | 12.3 | 30X151 = | 4530 |
| | 12.7 | 30X161 = | 4830 |
| | 14.0 | 30X196 = | 5880 |
| MAX. | 14.3 | 30X204 = | 6120 |

ENHANCED-

| | | | |
|---|---|---|---|
| MIN. | 15.3 | 30X234 = | 7020 |
| | 16.0 | 30X256 = | 7680 |
| | 16.5 | 30X272 = | 8160 |
| | 17.0 | 30X289 = | 8670 |

FIG. 2.

$$P = \begin{cases} >0 \text{ IF ENGINE ON / ALTERNATOR ENGAGED} \\ =0 \text{ IF ENGINE OFF / STARTER DISENGAGED} \\ <0 \text{ IF ENGINE OFF / STARTER ENGAGED} \end{cases}$$

FIG. 3.

CAPACITOR-BASED POWERING SYSTEM AND ASSOCIATED METHODS

RELATED APPLICATIONS

This application claims the benefit of and is related to Provisional Patent Application No. 60/286,772, filed Apr. 26, 2001 and titled Capacitor Starting System, Capacitor Having Auxiliary Cells, and Associated Methods, and Provisional Patent Application No. 60/238,903, filed Oct. 10, 2000 and titled Apparatus For Providing Portable Power To Machinery And Associated Methods, all of which are incorporated herein by reference in their entirety, and is a continuation-in-part of U.S. patent application Ser. No. 09/802,112, filed Mar. 8, 2001 now U.S. Pat. No. 6,426,606 and titled Apparatus For Providing Supplemental Power To An Electrical System and Related Methods.

FIELD OF THE INVENTION

The present invention relates to the field of powering systems and, more particularly, to capacitor-powered powering systems and associated methods for starting engines and providing powering auxiliary electrical devices in a vehicle.

BACKGROUND OF THE INVENTION

Engines such as those used to power automobiles and commercial vehicles typically are started by turning an ignition key. Turning the key causes a connection between a starter relay coil or solenoid switch and the positive terminal of a vehicle battery thereby energizing the coil and closing a contact on the relay. With the contact closed, the vehicle's starter motor is connected to the vehicle battery so as to crank the engine. In conventional starters, when the contact closes, it makes contact with a metal disc which completes a connection between the positive terminal of the battery and the primary terminal of an ignition coil. The engine is started in a conventional internal combustion engine by rotating a flywheel until the engine fires and is able to run on its own power, commonly referred to as cranking the engine. The flywheel typically is rotated by the starter motor, which is fed with current from the battery. After the motor starts, the ignition switch contact returns to its normal operating position, and the starter relay switch opens, thereby breaking contact with the disc.

Essentially, an automobile or commercial vehicle powered by a conventional internal combustion engine requires a starter that acts as a separate electric motor to rotate the engine crankshaft so as to start or crank the engine. Thus, to successfully start the engine, the starter must be able to rotate the crankshaft at a speed sufficient to fire-up the engine. The starter is electrically powered by the automobile battery, which also provides power to various vehicle devices such as the exterior and interior lights, the horn, temperature and fuel gauges, and a host of other accessory devices commonly found on the vehicle.

More generally, because the starter requires power to function, the vehicle requires a source of energy stored in a quantity sufficient to crank the engine while also providing power to other devices. In conventional systems, the power is supplied by the battery vehicle as already described. The battery also must power the vehicle's electrical system. The electrical systems of standard automobiles and commercial heavy-duty vehicles, at least since 1975, ordinarily have included an ever increasing number of various electronic control units (ECUs) of ever more complexity. Today, ECUs perform various critical functions on a vehicle. For example, injection of fuel into the combustion chamber on an internal combustion engine can be controlled by an ECU so that an electromagnetic injector pulses on-off so as to supply fuel quantities in a desired proportion to the air-intake. Similarly, ECUs are ordinarily used to control such electronic devices as door locks and outer mirrors on the vehicle. Of particular relevance in the context of the present invention, ECUs are frequently used to control the operation and sequencing of operations necessary for starting a vehicle.

The amount of power that must be supplied to power the electrical system as well as power the starter used to crank the engine is a function of the conditions under which the vehicle is operated. For example, during cold weather, the engine is more difficult to start thus requiring more energy to crank, and extra loads arise when devices such as the heater are left on while the engine is turned off. Thus, there is an ever prevalent need to provide the vehicle with a power supply that is both reliable and capable of providing power in a quantity sufficient to crank the vehicle engine under various operating conditions.

Power conventionally has been supplied in vehicles by standard lead storage batteries. A long-recognized limitation of lead storage batteries, however, is the batteries' inherent tendency toward relatively rapid depletion. Specifically, it has been estimated that such batteries possess an expected operation life of approximately one year. With continuous operation, moreover, the internal resistance of such a lead storage battery increases such that the battery's depletion occurs at an increasing rate over time.

Attempts have been made to provide more reliable sources of power for starting engines and powering electrical devices in vehicles. U.S. Pat. No. 5,146,095 to Tsuchiya et al., titled Low Discharge Capacitor Motor Starter System, for example, suggests supplementing the power supplied by a conventional vehicle battery by combining the battery with a high-density capacitor (also commonly referred to as a double-layer or molecular capacitor). Tsuchiya et al. requires that the capacitor be disconnected from the starter at all times save immediately prior to cranking the engine when the capacitor must be coupled to the starter in order to energize the starter for cranking. A more fundamental limitation of Tsuchiya et al., however, is that the battery nevertheless remains essential because, it is the battery that maintains the charge of the capacitor. Given the ever present need to maintain the charge on the capacitor in order to crank the engine, the useful life of a Tsuchiya et al. system remains substantially constrained by the useful life of the battery, as it is the battery that maintains the capacitor's charge.

Similarly, U.S. Pat. No. 5,207,194 to Clerici, titled System for Starting An Internal Combustion Engine For Motor Vehicles, suggests using a high-capacitance capacitor to supply power to the starter to crank a vehicle engine. Specifically, Clerici provides a set of switches that in a "second condition" connect the capacitor to the starter to power the starter when cranking the engine. In the "first condition," however, the switches connect the capacitor to the battery so that the capacitor can be charged by the battery. Hence, like Tsuchiya et al., Clerici also requires an adequately charged battery in order to maintain the charge on the capacitor in order to crank the engine. Thus, as with Tsuchiya et al., the usefulness of the Clerici system is constrained by the need for a charged battery in order to sustain the capacitor.

U.S. Pat. No. 5,925,938 to Tamor, titled Electrical System For A Motor Vehicle, also suggests using a capacitor and battery device for cranking an engine and powering a vehicle electrical system. Tamor, though, seeks to overcome the limitations inherent in Tsuchiya et al. and Clerici, by charging the capacitor with the alternator and/or battery. Power delivery in Tamor is current-controlled by a resistor-and-diode device that limits current from the battery to the starter when the engine is being cranked and allows current from the alternator to the capacitor and battery when the engine is running. A limitation noted in Tamor itself, however, is that the capacitor store relatively little energy and that capacitor recharging occur only infrequently. This is necessitated by the need to reduce the electrical loss that occurs through the resistor of the current control whenever it is necessary to recharge the capacitor off the battery.

There is thus the need for a system that provides power rapidly and efficiently to a vehicle starter to crank the vehicle's engine, powers the electrical system of the vehicle, and yet is also reliably maintained for continuous use over a prolonged period for powering both the starter and the electrical system.

SUMMARY OF THE INVENTION

With the foregoing in mind, the present invention advantageously provides an engine ignition and powering system that provides increased power for cranking an internal combustion engine and powering auxiliary electrical devices in a vehicle. An additional advantage of the present invention is the system's enhanced reliability under all operating conditions. Still further advantage of the present invention is the ability to reliably maintain the system's capabilities over prolonged periods of use. Another distinct advantage of the present invention is that the system provides cranking power to the engine independently of whether or not power is available from a conventional battery; a conventional battery can be advantageously incorporated as part of the system, but is not essential for starting the engine.

Moreover, a further advantage of the present invention is that the system also can power auxiliary electrical devices in a vehicle regardless of whether or not power is available from a conventional battery. This advantage can be critical even with a vehicle powered by both a capacitor and battery. Virtually all modern vehicles rely on various ECUs, and these ECUs include ones essential for controlling the sequence and operation of devices used to start the vehicle. Thus, in a vehicle disabled by a discharged battery, it is necessary to power not only the motor of the starter but also ECUs associated with engine starting. The system, according to the present invention, provides this critical capability.

Among the other distinct advantages provided by the present invention are control mechanisms that are operably efficient and easy to manufacture, especially as compared to conventional systems currently available. Yet an additional advantage is that the system can easily be incorporated into currently designed vehicles. As described herein, below, the features of the system are particularly advantageous when incorporated in heavy-duty vehicles commonly employed for transportation, construction, and agriculture.

The present invention, more specifically, provides an enhanced-power, capacitor-based starting system. The system incorporates a specialized capacitor having additional cells (i.e., an auxiliary-celled capacitor) that provide enhanced cranking power to the engine. As explained more fully below, it is recognized by the present invention that the powering capability of the capacitor is a function of the number of cells and accordingly the number of cells is dictated by the size of the engine. Thus, according to the present invention, adjustment of number of the capacitor cells provides an efficient method of adapting a capacitor so as to function effectively when incorporated into a vehicle having any set of engine, starter, and alternator parameters.

The system controls energy exchanges among the capacitor, starter, and alternator such that the starter and solenoid coils are supplied with power solely by the capacitor during the starting cycle thereby ensuring that starts are fast and efficient. When the engine has been started and is running under its own power, the system directs power from the alternator to the capacitor so that the charge of the capacitor is reliably maintained under virtually any operating conditions. More specifically, the system automatically connects the capacitor and the alternator in response only to a signal supplied by the alternator in the form of electrical current generated only if the alternator is operatively functioning.

Preferably control is provided using a single switch—more preferably a magnetic switch (solenoid) or an electron field effect transistor (FET)—that isolates the capacitor from the battery and the rest of the electrical system of the vehicle when the alternator is not generating electrical current. The alternator current provides a signal to close the otherwise open switch and connect the alternator and the capacitor. Preferably, when the engine is running and the alternator is producing current, the alternator's "I" terminal signals the switch to close thereby permitting the current generated by the alternator to flow to the capacitor as well as the battery so that both are charged with the vehicle alternator.

At other times when the engine is off and the switch accordingly is open, the capacitor is electrically isolated. This accomplishes two functions. Firstly, the capacitor is protected from being discharged by any electrical item on the vehicle (including, in the case of a large heavy-duty vehicle, electrical items in the cab or tractor). Secondly, the battery can be discharged while the capacitor is electrically isolated so that accessory devices are powered by the battery rather than the capacitor. For example, with respect to a commercial vehicle such as a heavy-duty cab and trailer rig, the driver/operator can power up the interior lights and heater in the cab while the engine is off. The amount of energy taken from the battery can also be controlled by the system.

Power levels are controlled, for example, using a voltage enhancer. Specifically, the amount of power can be adjusted through a converter that steps up the voltage between the alternator and the capacitor to thereby increase the amount of power supplied to the capacitor by the alternator as it simultaneously supplies power to the engine battery without any step-up. Thus, the capacitor is optimally charged using, for example, a dc/dc converter when the engine is running, the dc/dc converter stepping up voltage only to the capacitor, not the rest of the electrical system in the vehicle.

A particular advantage of the present invention, however, is that neither the enhancer nor the battery are essential to the system. Firstly, in recognizing the heretofore unrecognized relation between the power requirements of the starter (a function of the engine size, which also determines the requirements of the alternator) and the power supplied by the capacitor, the system accordingly allows the capacitor capabilities to be adjusted to accommodate the absence of a voltage enhancer regardless of and without requiring any modification of the operational parameters of the engine, starter, or alternator.

Secondly, the battery is not essential because the capacitor is able to supply sufficient power to drive the starter in cranking the engine and is recharged exclusively by the alternator. The ideal function of the battery is to power the ECUs of a vehicle even when the engine is not running. Accordingly, as already described, the system provides a control device that essentially isolates the capacitor from the ECUs when the alternator is not supplying current that can recharge the capacitor. Relatedly, though, it is recognized according to the present invention that because ECUs are essential in starting most modern vehicles, power must be available to the ECU even if the starter is powered by a capacitor. Therefore, the system provides an override that permits a user to selectively engage the capacitor even though the engine is off so as to power the ECUs in the event, for example, that the battery is completely disabled. Thus, the engine in an ECU controlled vehicle therefore can be started even without the battery; if the vehicle is disabled by a discharged battery, the user need only simultaneously engage the override and the starter. The ECU is then powered and the starter cranks the engine, both powered solely by the capacitor.

The present invention further provides a method for providing enhanced power to crank the engine of an automobile or commercial vehicle using capacitor-supplied power. The method further includes electrically isolating the capacitor from the automobile's or commercial vehicle's battery at preselected times, preferably by interposing a switch (e.g., a magnetic switch or electron FET) between the capacitor and the battery, the switch being responsive to current generated by the alternator. Another method aspects of the present invention is charging the capacitor using the vehicle alternator when the engine of the vehicle is running, preferably using a step-up converter to increase the voltage between the alternator and the capacitor.

Yet a further method aspect of the present invention includes electrically isolating the capacitor when the engine is not running, preferably by opening a magnetic switch or FET as already described above. This prevents the capacitor from discharging by supplying electrical power to the automobile's or commercial vehicle's electrical system when the engine is not running. At the same time, the battery can be used to power accessory devices (e.g., interior lighting or heater within the vehicle) when the engine is not running.

Still further, the method aspects of the present invention include starting the vehicle engine when the vehicle battery is adequately charged while keeping the magnetic switch or FET open. This permits the capacitor to singly supply power to the starter and starter solenoid. Thus, engine starting is faster and more efficient as compared with conventional starting methods. Furthermore, if the battery is discharged to such an extent that the ECU and the starter magnetic switch coil can not be energized, the vehicle operator can close the circuit, preferably using the boost button, as the operator turns the ignition switch to start the vehicle so that the capacitor-supplied power can be provided for all functions of starting directly from the capacitor.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 2 is a data comparison table illustrating differences in power levels achieved using a system according to the present invention;

FIG. 3 is a mathematical expression describing the conditions under which power is delivered to the capacitor and from the capacitor in a system according to the present invention;

DETAILED DESCRIPTION OF THE PREFERRED EMBODIMENT

Figure 1:
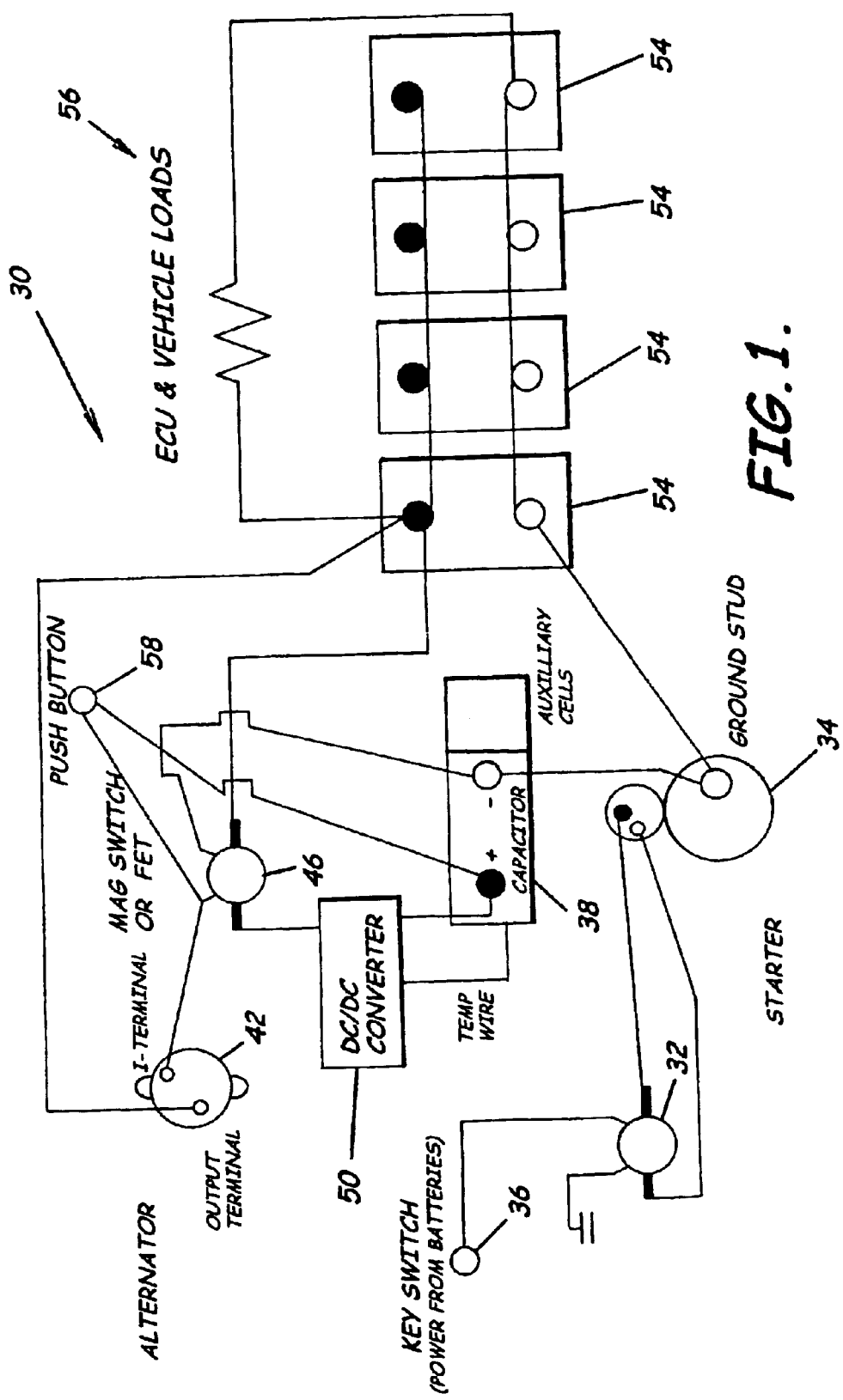
FIG. 1 is a schematic diagram of an enhanced-power capacitor-based power system according to the present invention.

The present invention will now be described more fully hereinafter with reference to the accompanying drawings which illustrate preferred embodiments of the invention. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, the prime notation, if used, indicates similar elements in alternative embodiments.

FIGS. 1–7 illustrate a capacitor-based power system 30 for starting an internal combustion engine 32 for use in any type of vehicle or equipment but providing particular advantage for powering heavy-duty vehicles and machinery requiring rapid starts under harsh operating conditions. As described below, the system 30 preferably includes a starter 34 powered by a special capacitor 38 having at least one extra or auxiliary cell. The system 30, moreover, is capable of maintaining the charge on the capacitor 38 at or above a predetermined energy level by supplying power to the capacitor 38 from a separate generator, such as the alternator 42 of a standard vehicle. Power from the capacitor 38 to the starter 34 and from the alternator to the capacitor 38 preferably is controlled by power delivery control means as described below. As also described below, the system 30 optionally includes at least one battery 54 (e.g., a lead storage battery), but permits the user to start the engine regardless of whether or not a sufficiently charged battery is available for supplying power, and relatedly, includes a power deliver control override 58 enabling a user to cause power to be delivered from the capacitor to the starter 34 and to any vehicle ECUs necessary to the starting of the engine.

SYSTEM OVERVIEW

FIG. 1 provides a schematic overview of the system 30, which provides a user-actuated ignition and powering system for starting and sustaining the operative functioning of an internal combustion engine 32 in a vehicle and for powering at least one ECU 56 employed in the vehicle to control a predetermined function associated with the operation or use of the vehicle. As illustrated in FIG. 1, the user-actuated ignition and powering system includes a starter 34 responsive to the user for starting the vehicle engine. Preferably, the starter 34 includes an electrically driven motor to crank the engine, for example, by rotating a flywheel at rotational speed sufficient to fire the engine 32 so that the engine, once fired, continues running under power supplied by internal combustion as readily understood by those skilled in the art.

The system 30 also preferably includes a capacitor 38 electrically connected to the starter 34 to provide power to drive the motor of the starter 34 and thereby enable the starter 34 to crank the engine 32. Further, the system 30 preferably includes an alternator 42 mechanically connected to the engine 32 and positioned to convert into electrical energy the mechanical energy generated by the engine 32 when the engine 32 is running. The alternator 42 is electrically connected to the capacitor 38 such that power can be delivered from the alternator 42 to the capacitor 38 to provide power to the capacitor 38 for maintaining the stored energy of the capacitor 38 substantially at or above a predetermined level.

Power exchanges are preferably controlled by a power delivery controller 46. As explained more fully below, the power deliver controller 46 permits power, P, to be delivered to the starter 34 from the capacitor 38 (P<0) when the engine is off and the starter is engaged. The power deliver controller 46 permits power, P, to be delivered from the alternator 42 to the capacitor 38 (P>0) when the engine is on and the alternator is engaged. Under other conditions, no power is delivered to or from the capacitor 38 (P=0) unless the override is engaged. (See FIG. 3). The power delivery controller 46 is responsive to the alternator 42. More specifically, the power delivery controller is responsive to current generated by the alternator 42, providing a conductive path between the alternator 42 and the capacitor 38 when and, generally, only when the alternator 42 is generating electrical current I. The alternator 42 delivers power via the conductive path to the capacitor 38 so as to maintain the charge on the capacitor 38. When the alternator 42 is not generating electrical current, the capacitor 38 is electrically connected to the starter 34 for effecting rapid power delivery to the starter 34 but is otherwise electrically isolated from other elements of the system 30, including any ECUs or batteries.

So formed, the system 30 provides multiple advantages. First, the capacitor 38 is maintained in an ever-ready state for effecting rapid power delivery to the starter 34 to crank the vehicle engine 32. Moreover, in contrast to other starting systems, the battery need not be charged in order to maintain the charge on the capacitor because the capacitor is charged off the alternator 42. Indeed, the system 30 function equally effectively in starting the engine 32 with the benefit of charged battery as with a discharged battery. Indeed, the system 30 can just as advantageously be employed in a vehicle or machinery having no such battery.

Secondly, there is a distinct advantage in having the power delivery controller 46 responsive to the alternator 42 and, more specifically, only to the electrical current generated by the alternator 42. Alternatively, were the power delivery controller 46 instead responsive to the ignition key or the starter switch 36, as it is with conventional devices, there would be the risk that the capacitor 38 could be inadvertently or futilely discharged when the alternator and/or other starting elements were disabled or defective. That is, if the capacitor 38 were not electrically isolated from other power draining elements (e.g., the battery or ECUs) except when the alternator generates current I, there is the risk that power would be drained from the capacitor rather than being supplied to the capacitor even though the engine were running. Making the power delivery controller 46 responsive only to the current, I, generated by the alternator provides a safeguard against such risk.

The power delivery controller 46 can include a current-responsive switch. The switch, for example, can be a magnetic or solenoid switch. Alternatively, the power delivery controller 46 can include a transistor, such as, for example, an electron field effect transistor (electron FET). Still further, the power deliver controller 46 can be a circuit device, such as a preprogrammed or programmable microprocessor. Preferably, to ensure against unwanted discharge of the capacitor 38, the switch is responsive to a signal generated by the "I" terminal of the alternator 42. More preferably the signal is provided by current, I, generated by the alternator 42. In response to the current, I, generated by the alternator 42, for example, the switch closes thereby closing an otherwise open connection between the alternator 42 and the capacitor 38. With the switch closed, a conductive path is complete between the alternator and the capacitor 38 via which power can be provided to the capacitor 38 from the alternator 42 so as to maintain the charge on the capacitor at or below a predetermined level.

Preferably, the system 30 further includes a voltage enhancer 50 electrically connected to the capacitor 38 and responsive to the power delivery controller 46. The voltage enhancer 50 enhances the voltage between the capacitor 38 and the alternator 42 when the alternator 42 is operatively generating electrical current, thereby increasing the amount of power delivered from the alternator 42 to the capacitor 38. The voltage between the alternator 42 and other elements of the system 30 is unaltered, however. The voltage enhancer 50 can be a step-up converter for increasing the power delivered from the alternator to the capacitor 38. Alternatively, according to the relationship explained below between the incremental power increase effected by changing the number of cells n used, the capacitor 38 can be adjusted according to the size of the engine 32 and related parameters associated with the starter 34 and alternator 42 such that the charge on the capacitor can be maintained without a voltage enhancer 50.

Optionally, but preferably, the system 30 also includes at least one battery 54 electrically connected to at least one ECU 56 of the vehicle. The at least one battery 54 preferably provides power to the at least one ECU 56. Therefore, each of the at least one ECUs can be powered by the at least one battery 54 without reducing the charge on the capacitor 38. As discussed in more detail below, this provides especially valuable benefits afforded by the system 30 in the context of starting a heavy duty commercial vehicle using the capacitor and powering the ECU and/or other auxiliary electrical devices from the at least one battery 54. Moreover, the charge on the at least one battery 54 can be maintained via a current path electrically connecting the alternator to the at least one battery 54 so that the at least one battery 54 receives power from the alternator 42 to thereby maintain the energy of the at least one battery 54 substantially at or above a second predetermined level.

The power delivery control override 58 is responsive to a user and electrically connected to each of the power delivery controller 46 and the capacitor 38 to override the power delivery controller 46 and provide power to the at least one ECU 56 so as to start the engine 32 as described below even if the at least one battery 54 is completely discharged.

SPECIAL CAPACITOR

The capacitor 38 of the system 30, as already described, can preferably be used in a commercial vehicle to provide a reliable source of enhanced power to crank the engine of the commercial vehicle and, as necessary, power the various ECUs of the vehicle including those essential to starting the vehicle's engine. This is accomplished, more preferably according to the present invention, by adding at least one additional or auxiliary cell to a high-density capacitor. A conventional high-density capacitor only has 10 cells. The present invention recognizes that these capacitors are insufficient to achieve the objectives of the system 30. Therefore, a modified capacitor 38 is employed having at least 11 cells. Each cell produces approximately 1.4 volts, so the normal voltage of the standard capacitor is only 14.0 volts (i.e., 10 cells×1.4 volts =14.0 volts). The enhanced-power capacitor 38 has at least eleven cells. Thus, the capacitor 38 will produce at least about 15.4 volts (i.e., 11 cells×1.4 volts =15.4 volts). More generally, each additional or auxiliary cell gives the enhanced-power capacitor 38 a twenty-one percent increase in power. FIG. 2 provides comparative data indicating the degree to which power P is enhanced by the enhanced-power capacitor over power levels attained with conventional devices, where P is a function of capacitance, C, and voltage, V, according to the familiar equation $P=(\frac{1}{2})CV^2$.

More generally, if it is assumed as a first approximation that each cell provides an increment of 1.4 additional volts to a capacitor having capacitance C, then the change in power per cell is $dp/dn = d[(\frac{1}{2})1.96\ Cn^2]/dn\ 1.96\ Cn$. As noted already, the relationship permits the number of cells n to be varied according to the parameters of a particular vehicle's engine, starter, and alternator. For example, the number of cells n can be varied so that enough power is delivered for starting a particularly sized engine without so depleting the capacitor 38 that a step-up converter or other voltage enhancer 50 is necessary for recharging the capacitor 38. This provides a particular advantage in that the system 30 can be adapted to any existing vehicle having any given set of engine, starter, and/or alternator parameters so that the system 30 can be employed in a vehicle, without any significant modification to the vehicle engine, starter, or alternator.

ENGINE RUNNING

Figure 4:
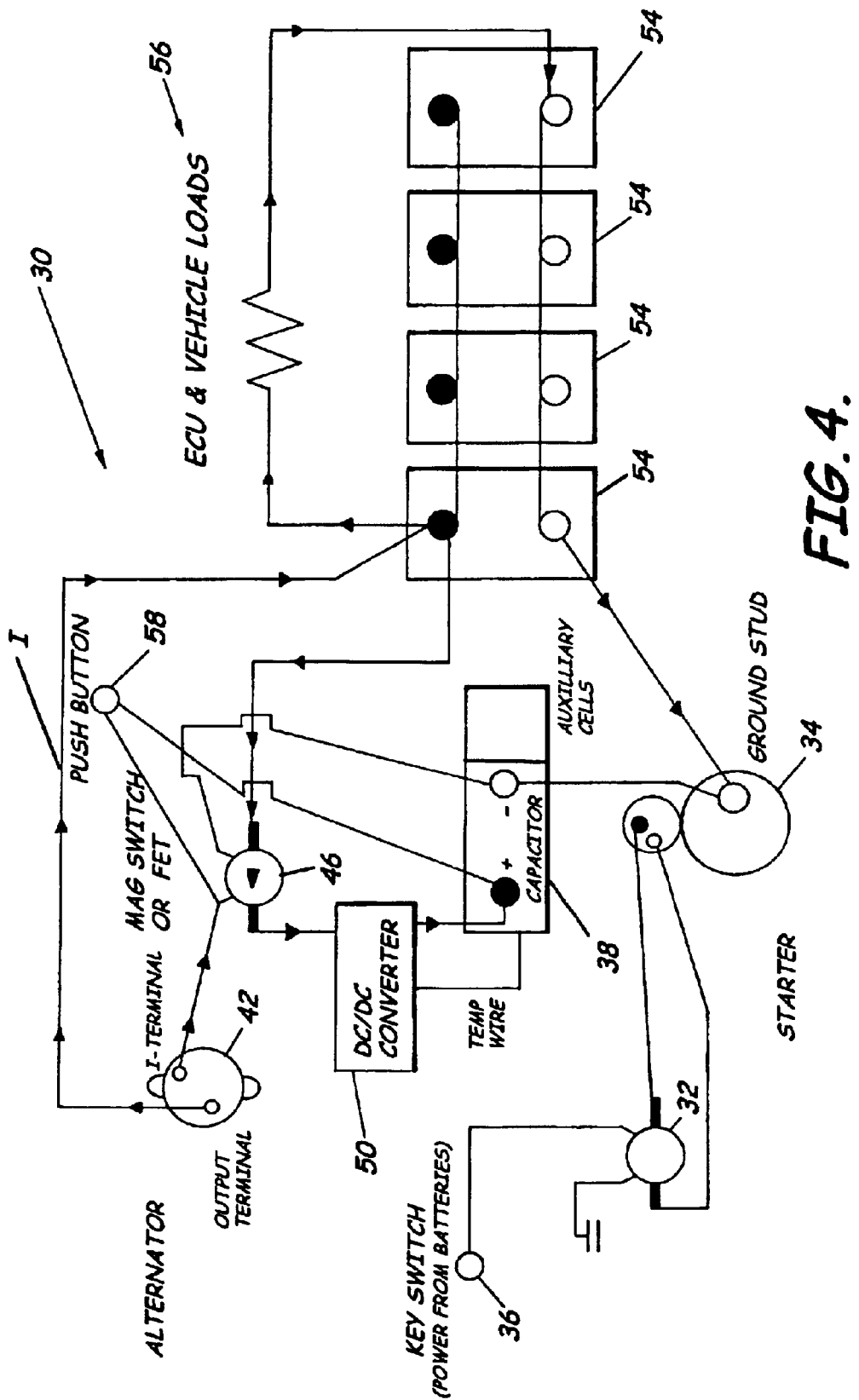
FIG. 4 is a schematic diagram of an enhanced-power capacitor-based power system according to the present invention.

As illustrated in FIGS. 3 and 4 when the engine 32 is running and the alternator 42 is producing current, the alternator's "I" terminal signals the power delivery controller 46. Preferably, this is accomplished using a switch responsive to the current so generated. For example, the power delivery controller 46 can be a magnetic switch or solenoid or, alternatively a transistor such as an electron FET. When the switch closes the enhanced-power capacitor and the battery each can be charged from the vehicle alternator. Specifically, the closed switch completes an otherwise open conductive path via which power is delivered by the alternator 42 to the capacitor 38 and, optionally, at least one battery 54 as described above. The amount of the voltage to the capacitor will depend, of course, on the temperature of the internal components of the capacitor. During very hot temperatures, for example, 100° F., the voltage applied to the capacitor will be approximately 15.8 volts. During very cold temperatures, for example, 0° F., the voltage applied to the capacitor would be approximately 17.0 volts. Accordingly, normal operating conditions for the system 30 are temperatures ranging from at least as low as 0° F. to at least as high as 100° F. Therefore, the system's ability to effect alternator-supplied charging of the capacitor allows the capacitor to have more power when it is needed such as during cold weather starting as also described above.

As perhaps best illustrated in FIG. 4, the system 30 comprising an enhanced-power capacitor, used in conjunction with a voltage enhancer 50 such as step-up converter for stepping up voltage, supplies power from the alternator 42 to the capacitor 38 while the vehicle is running. As illustrated, the magnetic switch or FET closes when energized by the "I" terminal of the alternator 42 when the engine is on. The alternator 42 thus charges the capacitor 38 and the at least one battery 54 as the engine 32 is running. Depending on the temperature of the capacitor 38, the capacitor 38 using the step-up converter will be charging at between 15.8 volts and 17.0 volts. The at least one battery 54 will be charging at a standard alternator voltage. Power is delivered as current, I, flows from the alternator 42 to the capacitor 38 and at least one battery 54 (see FIG. 4).

ENGINE OFF

Figure 5:
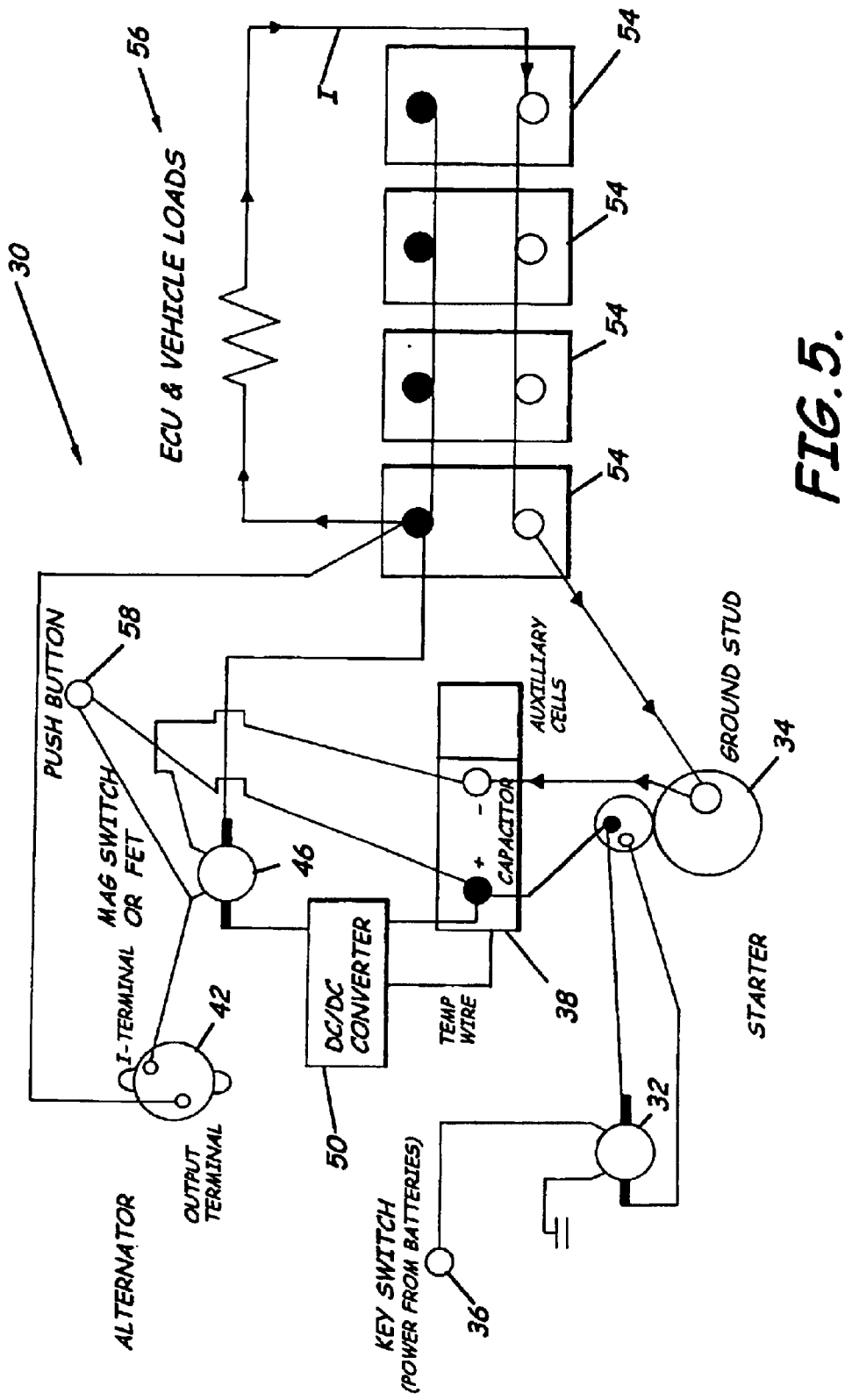
FIG. 5 is a schematic diagram of an enhanced-power capacitor-based power system according to the present invention.

FIGS. 3 and 5 illustrate the operation of the system 30 in a vehicle when the engine 32 is not running. When the engine 32 is off and the alternator has no output, the power delivery controller 46 isolates the capacitor 38, for example, by opening a magnetic switch or FET. Two things are accomplished by opening the power delivery controller 46 preferably provided by a switch (e.g., magnetic switch or FET). First, as noted above the capacitor 38 is protected from being discharged by any electrical item on the vehicle (e.g., ECU) or, in the case of a heavy-duty commercial vehicle, on the cab or tractor trailer of the commercial vehicle. Second, the at least one battery 54 can be discharged so as to power the electrical accessories (lights, heater, etc.) of the vehicle as well as any ECU's. The advantage of this is that the driver/operator is able to power the interior lights, heater, or other vehicle accessories while the engine 32 is off. The amount of energy taken from the at least one battery 54 can also be controlled by the system 30. Thus, in the case of a commercial vehicle, the driver/operator can enjoy light and heating from inside the comfort of the vehicle cab while the vehicle is parked and the engine 32 is turned off.

FIG. 5 illustrates the system 30 operating with the engine 32 off. Specifically, the power delivery controller 46 prevents discharge of the capacitor 38 (e.g., the magnetic switch or FET is open as already described). The open circuit thus isolates the capacitor electrically when the vehicle is not running so that there is no load on the capacitor 38. Specifically, with respect to a commercial vehicle there is no load on the capacitor from the vehicle accessories being operated inside the vehicle (or, with respect to a commercial vehicle, in the cab or on the tractor) when the vehicle is not running. Current, I, is supplied by the at least one battery 54 to thereby power the auxiliary electrical devices.

ENGINE STARTING WITH A CHARGED BATTERY

Figure 6:
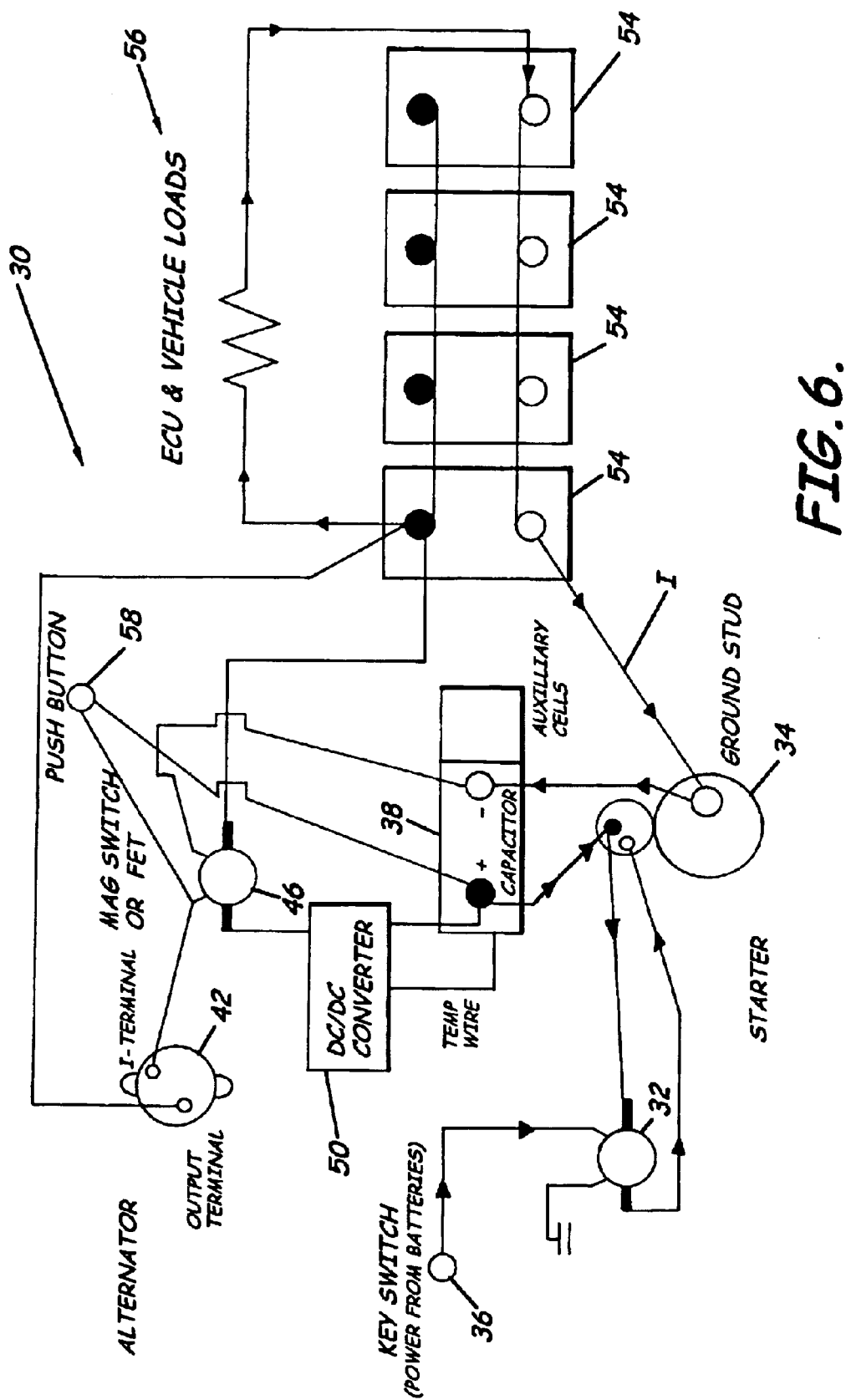
FIG. 6 is a schematic diagram of an enhanced-power capacitor-based power system according to the present invention.

During normal staring with a good battery (i.e., one adequately charged), the power delivery controller 46 permits power to be supplied by the capacitor 38 to start the engine 32 but otherwise maintains the electrical isolation of the capacitor 38 (e.g., the magnetic switch or FET remains open). All the power to the starter 34 (including the starter solenoid coils) is supplied by the capacitor 38. Thus, engine starting is faster and more efficient as compared to conventional starting systems. As illustrated in FIG. 6, using the enhanced-power capacitor, cranking power to the vehicle engine 32 is supplied by the capacitor 38 as current I flows from the capacitor 38 to the starter 34. For example, the magnetic switch or FET stays open during the cranking cycle. Thus, the capacitor remains electrically isolated when the vehicle is not running and thus there is no load on the capacitor 38 from the vehicle ECUs or other auxiliary electrical devices even during the cranking cycle.

ENGINE STARTING WITH A DISCHARGED BATTERY

Figure 7:
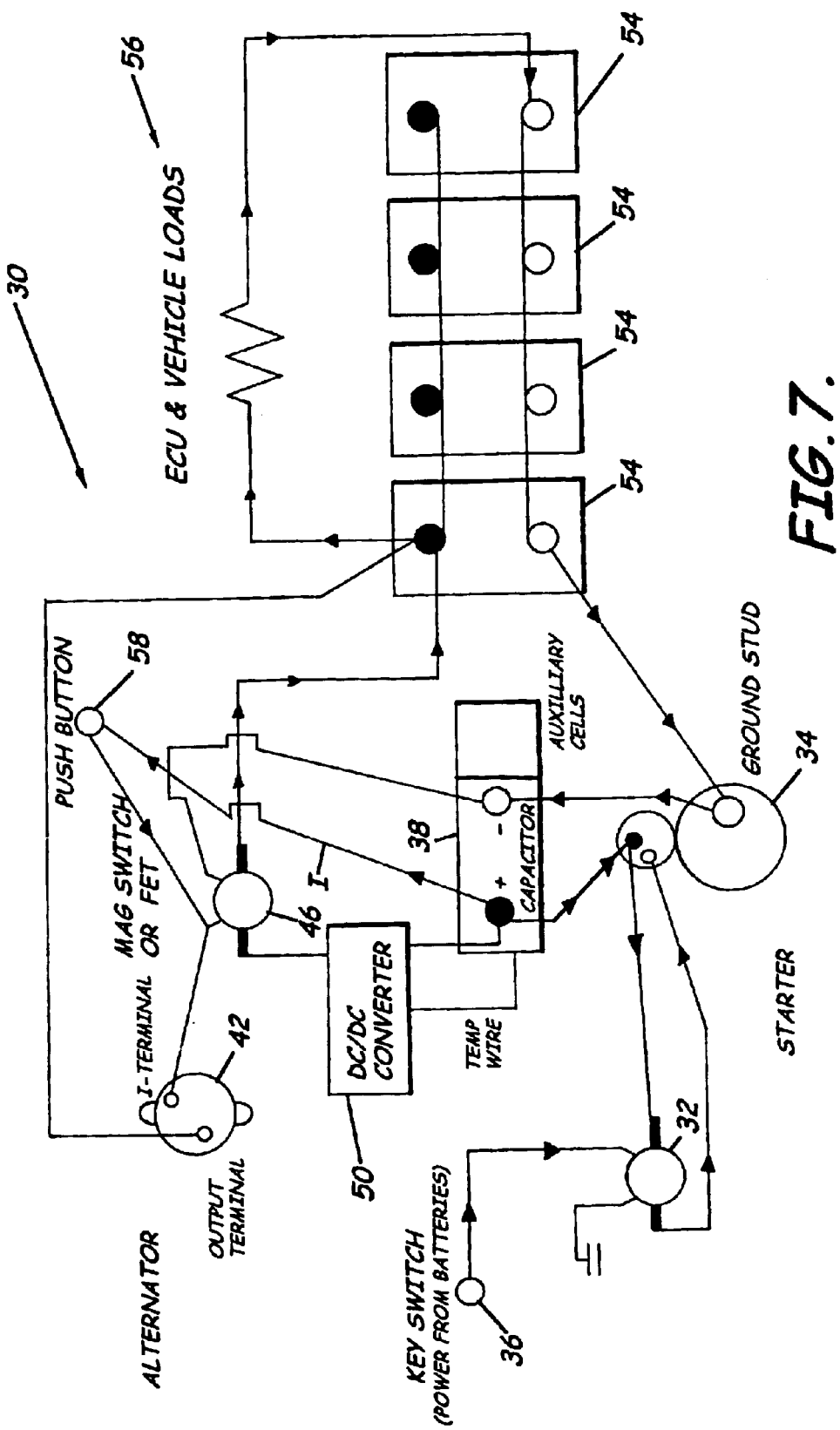
FIG. 7 is a schematic diagram of an enhanced-power capacitor-based power system according to the present invention.

If the at least one battery 54 is discharged to the point that the ECU 56 and the starter magnetic switch coil can not be energized during a starting attempt, the operator can use the override 58 (e.g. a manual switch or push button). As illustrated in FIG. 7, this provides a type of manual override when the power of the battery is too weak to power the ECU. The vehicle driver/operator activates the override 58, allowing current I to flow from the capacitor 38 to the ECU as well as the starter 34. Therefore, both the starter 34 and ECU 56 are powered so that the engine 32 can be started even though the at least one battery 54 is completely discharged. Thus, at the same time that the driver/operator turns the ignition switch to start the vehicle, he or she can push the boost button, and the capacitor will provide power for all the functions of starting.

METHOD ASPECTS

FIGS. 1–6 further illustrate various method aspects of the present invention. According to the present invention, a method for providing enhanced power to crank the engine 32 of an automobile or commercial vehicle using capacitor-supplied power. The system 30 includes increasing the amount of power stored by the capacitor 38, preferably by adding n additional cells to a high-density capacitor, and supplying power from the capacitor 38 to the starter 34 of the automobile or commercial vehicle. The method further includes electrically isolating the capacitor 38 from the automobile's or commercial vehicle's battery at preselected times, preferably by interposing a magnetic switch or FET between the capacitor 38 and the battery 54.

Further method aspects of the present invention include charging the capacitor 38 using the automobile's or commercial vehicle's alternator 42 when the engine 32 of the automobile or commercial vehicle is running, preferably using a step-up converter to step up the voltage only to the capacitor but not the rest of the electrical system of the vehicle or, alternatively, by varying the number of cells, n, so as to accommodate the parameters of the engine, starter, and alternator of the vehicle.

Yet a further method aspect of the present invention includes electrically isolating the capacitor 38 when the engine 32 is not running, preferably by opening a magnetic switch or FET as already described above. This prevents the capacitor 38 from discharging by supplying power to the automobile's or commercial vehicle's electrical system when the engine is not running. At the same time, the battery 54 can be used to power accessory devices (e.g., interior lighting or heater within the vehicle) when the engine 32 is not running.

Still further, the method aspects of the present invention include starting the vehicle engine 32 when the vehicle battery 54 is adequately charged while keeping the magnetic switch or FET open. This permits the capacitor 38 to singly supply power to the starter 34 and ECU 56. Thus, engine starting is faster and more efficient as compared with conventional starting methods. Furthermore, if the battery is discharged to such an extent that the ECU and the starter magnetic switch coil can not be energized, the vehicle operator can close the circuit, using an override circuit 58 (e.g. manual switch or push button) as the operator turns the ignition switch 36 to start the vehicle engine 32 so that the capacitor-supplied power can be provided for all functions of starting directly from the capacitor 38.

What is claimed is:

1. A user-actuated ignition and powering system for starting and sustaining the operative functioning of an internal combustion engine in a vehicle and powering at least one electronic control unit positioned to control a predetermined function associated with the operation or use of a vehicle, the user-actuated ignition and power system comprising:

a starter responsive to the user and having an electrically driven motor to crank the engine;

a capacitor electrically connected to the starter to provide power to drive the motor of the starter and thereby enable the starter to crank the engine;

an alternator mechanically connected to the engine and electrically connected to the capacitor to convert mechanical energy generated by the engine when the engine is operatively functioning into electrical energy to provide power to the capacitor for maintaining the stored energy of the capacitor substantially at or above a first predetermined level;

power delivery controller connected to the capacitor and responsive to the alternator for controlling power delivery to and from the capacitor by permitting power to be delivered from the capacitor to the starter when the starter is engaged to crank the engine, permitting power to be delivered to the capacitor from the alternator when the alternator is operatively generating electrical current such that the stored energy of the capacitor is maintained at or above the predetermined level, and electrically isolating the capacitor from the at least one electronic control unit to thereby prevent discharge of power from the capacitor to the electrical system of the vehicle;

a voltage enhancer electrically connected to the capacitor and responsive to the power delivery controller to enhance voltage between the capacitor and the alternator when the alternator is operatively generating electrical current to thereby increase the power delivered from the alternator to the capacitor;

at least one battery electrically connected to the at least one electronic control unit of the vehicle to provide power to the electronic control unit and electrically connected to the alternator to receive power from the alternator to thereby maintain the energy of the battery substantially at or above a second predetermined level; and a power delivery control override responsive to a user and electrically connected to each of the power delivery controller and the capacitor to override the power delivery controller and provide power to the electronic control unit from the capacitor.

2. A system as defined in claim 1, wherein capacitor has at least eleven cells to readily provide a voltage greater than about fourteen and six-tenths volts (14.6 V).

3. A system as defined in claim 2, wherein the capacitor provides at least fifteen volts (15.0 V) during normal operating conditions to thereby generate more than six kilowatts (6 kW) of power to the starter.

4. A system as defined in claim 3, wherein the power delivery controller comprises a switch responsive to an electrical signal supplied by the alternator when the alternator is generating electrical current, the switch being operatively responsive to the electrical signal by closing an open connection along a current path between the alternator and the capacitor to thereby permit power to be delivered to the capacitor from the alternator when the alternator is generating electrical current such that the stored energy of the capacitor is maintained substantially at or above the predetermined level.

5. A system as defined in claim 1, wherein the switch comprises at least one of a transistor or a magnetic switch.

6. A system as defined in claim 5, wherein the voltage enhancer comprises a step-up converter electrically connected to the capacitor and the power delivery controller to step-up the voltage between the capacitor and the alternator to thereby ensure that the voltage is at least about fifteen volts (15.0 V) and less than about seventeen and eight-tenths volts (17.8 V) during normal operating conditions as power is delivered to the capacitor when the starter is disengaged and the alternator is operatively generating electrical current.

7. A user-actuated ignition system for starting an internal combustion engine in a vehicle, the system comprising:
    a starter responsive to the user and having an electrically driven motor to crank the engine;
    a capacitor electrically connected to the starter to provide electric power for driving the motor of the starter and thereby enabling the starter to crank the engine;
    an alternator mechanically connected to the engine and electrically connected to the capacitor to convert mechanical energy generated by the engine when the engine is operatively functioning into electrical energy to provide power to the capacitor for maintaining the stored energy of the capacitor substantially at or above a predetermined level; and
    a power delivery controller connected to the capacitor and responsive to the alternator for controlling power delivery to and from the capacitor by permitting power to be delivered from the capacitor to the starter when the starter is engaged to crank the engine and permitting power to be delivered to the capacitor from the alternator when the alternator is operatively generating electrical current such that the stored energy of the capacitor is maintained at or above the predetermined level.

8. A system as defined in claim 7, wherein the capacitor provides at least about fifteen volts (15.0 V) during normal operating conditions to thereby generate more than about six kilowatts of power (6 kW) to the starter.

9. A system as defined in claim 8, wherein the capacitor has at least eleven cells to thereby readily provide a voltage greater than 14.6 volts during normal operating conditions.

10. A system as defined in claim 9, further comprising a voltage enhancer electrically connected to the capacitor and to the alternator to enhance the voltage between the capacitor and the alternator to thereby increase the power delivered from the alternator to the capacitor when the alternator is operatively generating electrical current.

11. A system as defined in claim 10, wherein the voltage enhancer comprises a step-up converter electrically connected to the capacitor and alternator to thereby ensure that the voltage is at least about fifteen volts (15.0 V) and less than about seventeen and eight-tenths volts (17.8 V) during normal operating conditions as power is delivered to the capacitor when the starter is disengaged and the alternator is operatively generating electrical current.

12. A system as defined in claim 7, wherein the power delivery controller comprises a switch responsive to an electrical signal supplied by the alternator when the alternator is generating electrical current, the switch being operatively responsive to the electrical signal by closing an open connection along a current path between the alternator and the capacitor to thereby permit power to be delivered to the capacitor from the alternator when the alternator is generating electrical current such that the stored energy of the capacitor is maintained substantially at or above the predetermined level.

13. A system as defined in claim 12, wherein the switch comprises at least one of a transistor or a magnetic switch.

14. A user-actuated ignition system for starting an internal combustion engine in a vehicle, the system comprising:
    a starter responsive to the user and having an electrically driven motor to crank the engine;
    an alternator; and
    an n-celled high-density capacitor electrically connected to the starter to provide power for driving the motor of the starter and thereby enabling the starter to crank the engine and connected to the alternator through a power delivery controller responsive to the alternator for receiving power from the alternator when the alternator is generating electrical current, the number of cells, n, corresponding to the amount of power delivered to the starter by the capacitor and the amount of power delivered from the alternator to the capacitor.

15. A system as defined in claim 14, further comprising a power delivery control override responsive to a user and electrically connected to the capacitor and at least one vehicle engine control unit to selectively connect and disconnect the capacitor from the at least one vehicle engine control unit.

16. A system as defined in claim 14, wherein the (10+i)th cell, $i \geq 1$ provides an incremental power increase of greater than about one and ninety six hundredths (1.96) times the product of the capacitance, C, of the capacitor and the total number of cells, n, and wherein power, p, is determined by the product 0.98 times the capacitance of the capacitor times the square of the number of cells employed in the system, according to the formula $p=0.98(C)(n^2)$ watts, where C is the capacitance of the capacitor and n is the number of cells.

17. An internal combustion engine starting system comprising:
    a starter to crank the engine when engaged;
    an alternator mechanically connected to the engine to convert mechanical energy generated by the engine when the engine is operatively functioning into electrical energy;
    a capacitor electrically connected to each of the starter and the alternator to provide power to the starter and receive power from the alternator, and capacitor having at least eleven cells which readily provides a voltage greater than 14.6 volts during normal operating conditions and responsive to the starter to prevent power from being delivered by the capacitor to the starter when the starter is disengaged; and
    a power delivery controller electrically connected to the capacitor and responsive to the alternator to permit power to be delivered to the capacitor from the alternator when the starter is disengaged and the alternator is operatively generating electrical current such that the energy level of the capacitor is maintained within a predetermined range while permitting power to be delivered to the starter when the starter is engaged.

18. A system as defined in claim 17, wherein the capacitor provides at least fifteen volts (15.0 V) under normal operating conditions to thereby generate more than six kilowatts of power (6 kW) to the starter.

19. A system as defined in claim 17, wherein the power delivery controller comprises a transistor responsive to an electrical signal supplied by the alternator when the alternator is generating electrical current, the transistor closing in response to the electrical system to permit power to be delivered to the capacitor from the alternator when the starter is disengaged and the alternator is operatively generating electrical current such that the energy level of the capacitor is maintained within a predetermined range.

20. A system as defined in claim 19, wherein the power delivery controller comprises a magnetic switch responsive to an electrical signal supplied by the alternator when the alternator is generating electrical current, the magnetic switch closing in response to the electrical system to permit power to be delivered to the capacitor from the alternator when the starter is disengaged and the alternator is operatively generating electrical current such that the energy level of the capacitor is maintained within a predetermined range.

21. A method for selectively providing power to an electrical system associated with an internal combustion engine connected to a starter, an alternator, and a battery, the method comprising:

supplying power from a capacitor to the starter when the engine is being started, the capacitor having at least eleven cells, defining an enhanced-power capacitor, to thereby readily provide a voltage greater than 14.6 volts during normal operating conditions;

preventing delivery of power from the enhanced-power capacitor to the electrical system when the engine is not being started; and providing power from the alternator to the enhanced-power capacitor when the engine is running, by providing a closed conductive path between the alternator and the capacitor, the path being established in response to a current generated by the alternator.

22. A method as defined in claim 21, wherein the step of supplying power to the starter comprises generating more than six kilowatts of power (6 kW) to the starter by providing a voltage with the enhanced-power capacitor of at least fifteen volts (15.0 V) under normal operating conditions.

23. A method as defined in claim 21, wherein the step of providing power from the alternator to the capacitor comprises providing a capacitor having a voltage level sufficient to deliver enough power to the starter to crank the engine and be recharged directly by the alternator.

24. A method as defined in claim 23, wherein the step of providing power from the alternator to the capacitor comprises providing a capacitor having n cells wherein each cell provides an incremental increase in power of the product one and ninety six hundredths times the capacitance of the capacitor, C, and the number of cells, n, as represented by the expression 1.96(C)(n).

25. A method as defined in claim 21, wherein the step of providing power from the alternator to the capacitor further comprises stepping-up the voltage between the capacitor and the alternator such that the voltage is at least about fifteen volts (15.0 V) and less than about 17.8 volts (17.8 V).

26. A method as defined in claim 21, wherein the step of preventing delivery of power from the capacitor to the electrical system comprises electrically isolating the capacitor from the electrical system.

27. A method as defined in claim 26, wherein the step of preventing delivery of power by isolating the enhanced-power capacitor comprises providing a transistor that is connected to the enhanced-power capacitor and that provides an open electrical connection when the engine is not running.

28. A method as defined in claim 26, wherein the step of preventing delivery of power by isolating the enhanced-power capacitor comprises providing a magnetic switch that is connected to the enhanced-power capacitor and that provides an open electrical connection when the engine is not running.

29. A method as defined in claim 21, further comprising selectively supplying power from the capacitor to the electrical system by a user.

30. A method as defined in claim 29, wherein the step of selectively supplying power from the capacitor to the electrical system is preformed by the user when the power available to the electrical system from the battery is insufficient to perform a function otherwise powered by the electrical system.

31. A starting system for starting an internal combustion engine of a vehicle having an internal combustion engine, a starter, and an alternator, the system comprising:

a capacitor adapted to be electrically connected to the starter to provide power for driving the starter and thereby enable the starter to crank the internal combustion engine; and a power delivery controller adapted to be electrically connected to the capacitor, adapted to be electrically connected to the alternator, and responsive to the alternator to permit power to be delivered to the capacitor from the alternator only when the alternator is operatively generating electrical current.

32. A system as defined in claim 31, further comprising a voltage enhancer adapted to be electrically connected to the capacitor and adapted to be electrically connected to the alternator to enhance the voltage between the capacitor and the alternator to thereby increase the power delivered from the alternator to the capacitor when the alternator is operatively generating electrical current.

33. A system as defined in claim 31, further comprising at least one electronic control unit positioned to control a predetermined function associated with the operation or use of a vehicle, wherein the power delivery controller is further adapted to be electrically connected to the at least one engine control unit, and wherein the power delivery controller prevents power from being delivered from the capacitor to the at least one engine control unit.

34. A system as defined in claim 33, further comprising a power delivery control override responsive to a user and adapted to be electrically connected to each of the power delivery controller and the capacitor to override the power delivery controller to provide power to the electronic control unit from the capacitor to start the engine.

35. A system as defined in claim 31, wherein the power delivery controller is responsive to the alternator to permit power to be delivered to the capacitor from the alternator when the starter is disengaged and the alternator is operatively generating electrical current such that the energy level of the capacitor is maintained within a predetermined range while permitting power to be delivered to the starter when the starter is engaged.

36. A system as defined in claim 31, wherein the capacitor is an n-celled high-density capacitor, the number of cells, n, corresponding to the amount of power delivered to the starter by the capacitor and the amount of power delivered from the alternator to the capacitor.

* * * * *